(12) United States Patent
Marumo (10) Patent No.: US 11,007,701 B2
(45) Date of Patent: May 18, 2021

(54) BLOW MOLD

(71) Applicant: NISSEI ASB MACHINE CO., LTD., Nagano (JP)

(72) Inventor: Kenji Marumo, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 16/341,320

(22) PCT Filed: Oct. 12, 2017

(86) PCT No.: PCT/JP2017/037080
§ 371 (c)(1),
(2) Date: Apr. 11, 2019

(87) PCT Pub. No.: WO2018/070499
PCT Pub. Date: Apr. 19, 2018

(65) Prior Publication Data
US 2020/0047396 A1    Feb. 13, 2020

(30) Foreign Application Priority Data
Oct. 12, 2016   (JP) .............................. JP2016-201322

(51) Int. Cl.
*B29C 49/48* (2006.01)
*B29L 31/00* (2006.01)

(52) U.S. Cl.
CPC ..... *B29C 49/4815* (2013.01); *B29L 2031/712* (2013.01)

(58) Field of Classification Search
CPC ..................... B29C 49/4815; B29C 2049/4807
See application file for complete search history.

(56) References Cited

U.S. PATENT DOCUMENTS

| 2004/0065636 | A1 | 4/2004 | Thibodeau et al. |
| 2007/0098935 | A1 | 5/2007 | Farran et al. |
| 2007/0290413 | A1 | 12/2007 | Tonga |

(Continued)

FOREIGN PATENT DOCUMENTS

| CN | 101374647 A | 2/2009 |
| EP | 2 391 495 | 11/2015 |
| JP | 2-72925 | 3/1990 |

(Continued)

OTHER PUBLICATIONS

Official Communication issued in International Application No. PCT/JP2017/037080, dated Nov. 14, 2017.

(Continued)

*Primary Examiner* — Robert B Davis
(74) *Attorney, Agent, or Firm* — Greenblum & Bernstein, P.L.C.

(57) ABSTRACT

A blow mold is provided and includes a cavity mold composed of a pair of split molds for forming a cavity in which a preform is to be housed, a link member having one end side pivotably supported by a shaft member, and having on another end side a recess insert die which presses the preform during blow molding to form a grip portion, and a cam member which is provided lateral to the cavity mold so as to be linearly movable, and which presses the link member in accordance with a linear movement thereof to pivot the link member.

14 Claims, 8 Drawing Sheets

(56) References Cited

U.S. PATENT DOCUMENTS

2009/0011069 A1    1/2009  Derouault et al.
2014/0263160 A1*   9/2014  Guerin ............... B29C 49/4802
                                                              425/525

FOREIGN PATENT DOCUMENTS

| JP | 10-272679 | 10/1998 | | |
|----|-----------|---------|----|----|
| JP | 11-314268 | 11/1999 | | |
| JP | 2000-246790 | 9/2000 | | |
| JP | 2003-103612 | 4/2003 | | |
| JP | 2008-519709 | 6/2008 | | |
| WO | 2004/033319 | 4/2004 | | |
| WO | 2006/051182 | 5/2006 | | |
| WO | WO-2010015219 A2 * | 2/2010 | ......... | B29C 49/4802 |
| WO | 2017/073699 | 5/2017 | | |

OTHER PUBLICATIONS

Supplementary European Search Report dated Apr. 23, 2020, in EP Application No. 17860828.7.
Office Action issued in Chinese Patent Application No. 201780063007 dated Dec. 29, 2020, along with English Translation thereof.

* cited by examiner

BLOW MOLD

TECHNICAL FIELD

This invention relates to a blow mold for blow-molding a resin container having a grip portion.

BACKGROUND ART

As a resin container for accommodating a seasoning or a beverage, for example, one equipped with a grip portion, i.e., a recess in a part of the container, for easy portability has been available (see, for example, Patent Document 1).

As described in Patent Document 1 as well, the resin container with the grip portion is generally formed by blow-molding a preform by means of a blow molding apparatus. The grip portion is formed by pressing the preform with the use of a grip molding section (movable insert die) when blow-molding the preform within a cavity of a blow mold.

Among various moving mechanisms present for the grip molding section is one, for example, which is configured to move the grip molding sections (plugs) forward in a mutually approaching direction from the right and left sides of the cavity by actuator devices operated by a hydraulic or pneumatic pressure (see Patent Document 2).

PRIOR ART DOCUMENTS

Patent Documents

Patent Document 1: JP-A-2003-103612
Patent Document 2: JP-A-Hei-2-72925

SUMMARY OF THE INVENTION

Problems to be Solved by the Invention

When the grip molding section is moved by the actuator device, as described above, it is necessary to provide a plurality of the actuator devices corresponding to the respective grip molding sections, thus potentially posing the problem that the blow molding apparatus is upsized or entails a high cost.

Particularly in a blow molding apparatus having a plurality of blow molds arranged adjacently and being capable of forming a plurality of resin contains at a time, such a problem is apt to occur.

The present invention has been accomplished in the light of the above circumstances. It is an object of the invention to provide a blow mold whose structure can be simplified for downsizing and which can cut down on costs involved.

Means for Solving the Problems

An aspect of the present invention, intended to solve the above problems, is a blow mold for blow-molding a resin container equipped with a grip portion, the blow mold comprising: a cavity mold composed of a pair of split molds for forming a cavity in which a bottomed cylindrical preform is to be housed; a link member having one end side pivotably supported by a shaft member, and having on the other end side a recess insert die which presses the preform during blow molding to form the grip portion; and a cam member which is provided lateral to the cavity mold so as to be linearly movable, and which presses the link member in accordance with a linear movement thereof to pivot the link member.

Preferably, the cam member has a first cam portion for pressing the link member toward the cavity in accordance with the linear movement to pivot the link member. Also preferably, the cam member has a second cam portion for pressing the link member toward the outside of the cavity to pivot the link member.

It is further preferred that the first cam portion and the second cam portion be provided at a distance in the height direction of the cavity mold. For example, the first cam portion is provided to protrude from a body part of the cam member toward the cavity mold, whereas the second cam portion is provided to extend in a cantilever form from the body part along an end surface of the first cam portion.

It is preferred for the link member to have a first cam follower which the first cam portion contacts and which rolls on a surface of the first cam portion, and to have, separately from the first cam follower, a second cam follower which the second cam portion contacts and which rolls on a surface of the second cam portion.

It is preferred that the diameter of the second cam follower be smaller than the diameter of the first cam follower. It is further preferred that the shaft center of the second cam follower be disposed outwardly of the cavity with respect to the shaft center of the first cam follower.

Preferably, the blow mold is equipped with a plurality of the cavity molds arranged adjacently, a plurality of the cam members provided in correspondence with the cavity molds are fixed to a coupling member and integrated therewith, and an actuator device for linearly reciprocating the coupling member is connected to one end side of the coupling member to which the plurality of cam members are fixed.

Effects of the Invention

According to the present invention described above, it is possible to simplify the structure of a blow mold comparatively and downsize a blow molding apparatus. Concretely, a plurality of cam members can be operated using a single actuator device. Thus, the present invention is particularly effective in a blow mold for multiple-article production which is equipped with a plurality of cavity molds. It can downsize the apparatus, and cut down on costs.

MODE FOR CARRYING OUT THE INVENTION

An embodiment of the present invention will now be described in detail by reference to the accompanying drawings.

Figure 1A:
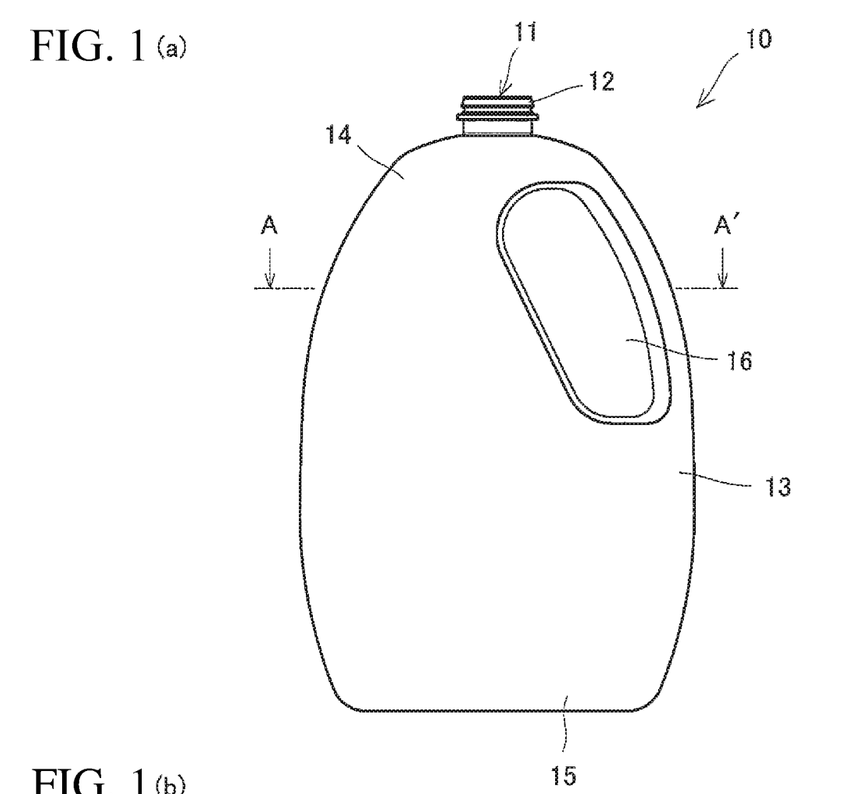
FIGS. 1(a), 1(b) are a front view and a sectional view showing an example of a resin container equipped with a grip portion.
Figure 1B:
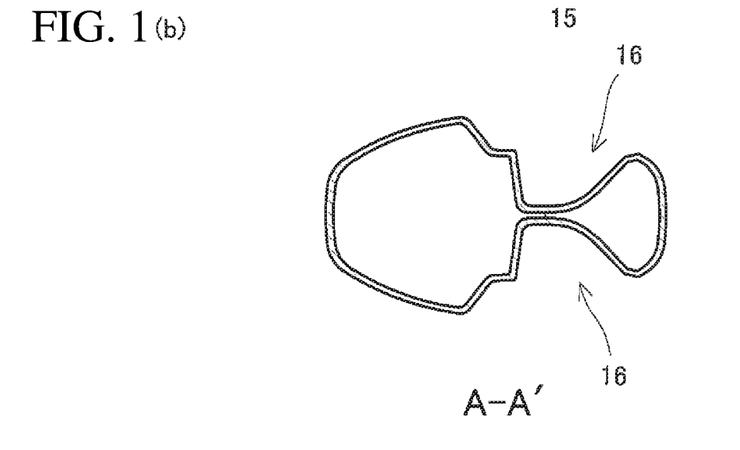

FIGS. 1(*a*), 1(*b*) are views showing an example of a resin container to be blow-molded using a blow mold according to the present invention, FIG. 1(*a*) being a front view, and FIG. 1(*b*) a sectional view taken on A-A' in FIG. 1(*a*).

As shown in FIG. 1(*a*), a resin container 10 is a container for accommodating a liquid such as a seasoning or a beverage, and comprises a neck 12 having a mouth 11 at the upper end, a cylindrical barrel 13, a shoulder 14 connecting the neck 12 and the barrel 13 and gradually increasing in inner diameter, starting on the side of the neck 12, and a bottom 15 sealing one end of the barrel 13. As shown in FIG. 1(*b*) which is a horizontally sectional view, moreover, in the present embodiment, the barrel 13 and the shoulder 14 of the resin container 10 are formed in a nearly elliptical exterior shape.

In the barrel 13 and the shoulder 14 having a nearly elliptical exterior shape, a grip portion 16 which is a recessed part for gripping is formed on one end side in the long-side direction of them. The grip portion 16 is formed by recessing a part of the resin container 10. In the present embodiment, the grip portion 16 is formed along the contour (curves) of the shoulder 14 in consideration of, say, the ease of gripping when a consumer grasps the resin container 10.

The resin container 10 having such a grip portion 16 is composed of a resin material such as polyethylene terephthalate (PET), and is formed by blow-molding a preform of a predetermined shape by use of a blow molding apparatus.

The shape of the resin container 10 including the grip portion 16 is merely an example, and the resin container 10 formed by the blow mold according to the present invention is not limited to this shape.

Hereinafter, a blow molding apparatus provided with the blow mold of the present invention, which molds the resin container 10 having the grip portion 16, will be described in detail.

Figure 2:
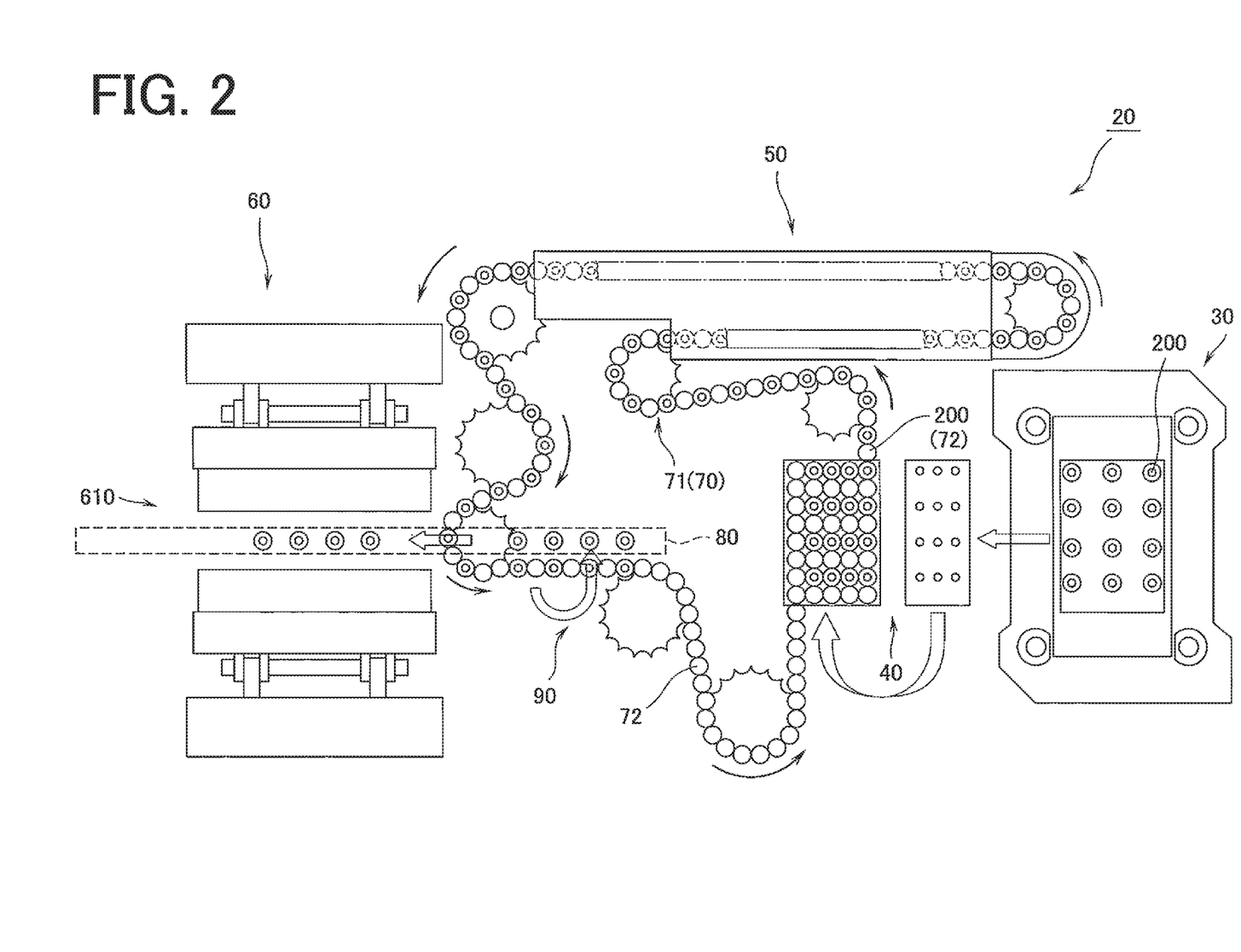
FIG. 2 is a plan view showing the overall configuration of a blow molding apparatus according to the present invention.

As shown in FIG. 2, a blow molding apparatus 20 comprises an injection molding section 30 for injection-molding a preform 200 to be formed into a hollow container, a cooling section 40 for cooling the preform 200 molded by the injection molding section 30, a heating section 50 for heating the preform 200, and a blow molding section 60 for blow-molding the preform 200 with the use of a blow mold 610 to be described later.

The blow molding apparatus 20 is also equipped with a continuous transport section 70 for transporting the preform 200 molded by the injection molding section 30 to the blow molding section 60. The continuous transport section 70 has a transport line 71, and continuously transports the preform 200 loaded on a transport jig 72 along the transport line 71.

Furthermore, the blow molding apparatus 20 has, on a side downstream of the heating section 50 on the transport line 71, an intermittent transport section 80 for holding a plurality of (e.g., four) the preforms 200 and transporting them intermittently to the blow molding section 60, and a delivery section 90 for receiving the preforms 200 continuously transported by the continuous transport section 70 from the transport line 71 and passing them on to the intermittent transport section 80.

The configurations of the injection molding section 30, cooling section 40, and heating section 50 constituting the blow molding apparatus 20 according to the present embodiment, and the configurations of the continuous transport section 70, intermittent transport section 80, and delivery section 90 for transporting the preform 200 are publicly known. Hence, explanations for them will be omitted here (if necessary, reference is requested to WO2012/057016 belonging to the present applicant).

The blow molding apparatus 20 according to the present invention is characterized by the configuration of the blow molding section 60 among the injection molding section 30, the cooling section 40, the heating section 50, the blow molding section 60, the continuous transport section 70, the intermittent transport section 80, and the delivery section 90. That is, the present invention is characterized by the configuration of the blow mold provided in the blow molding section 60.

Figure 3:
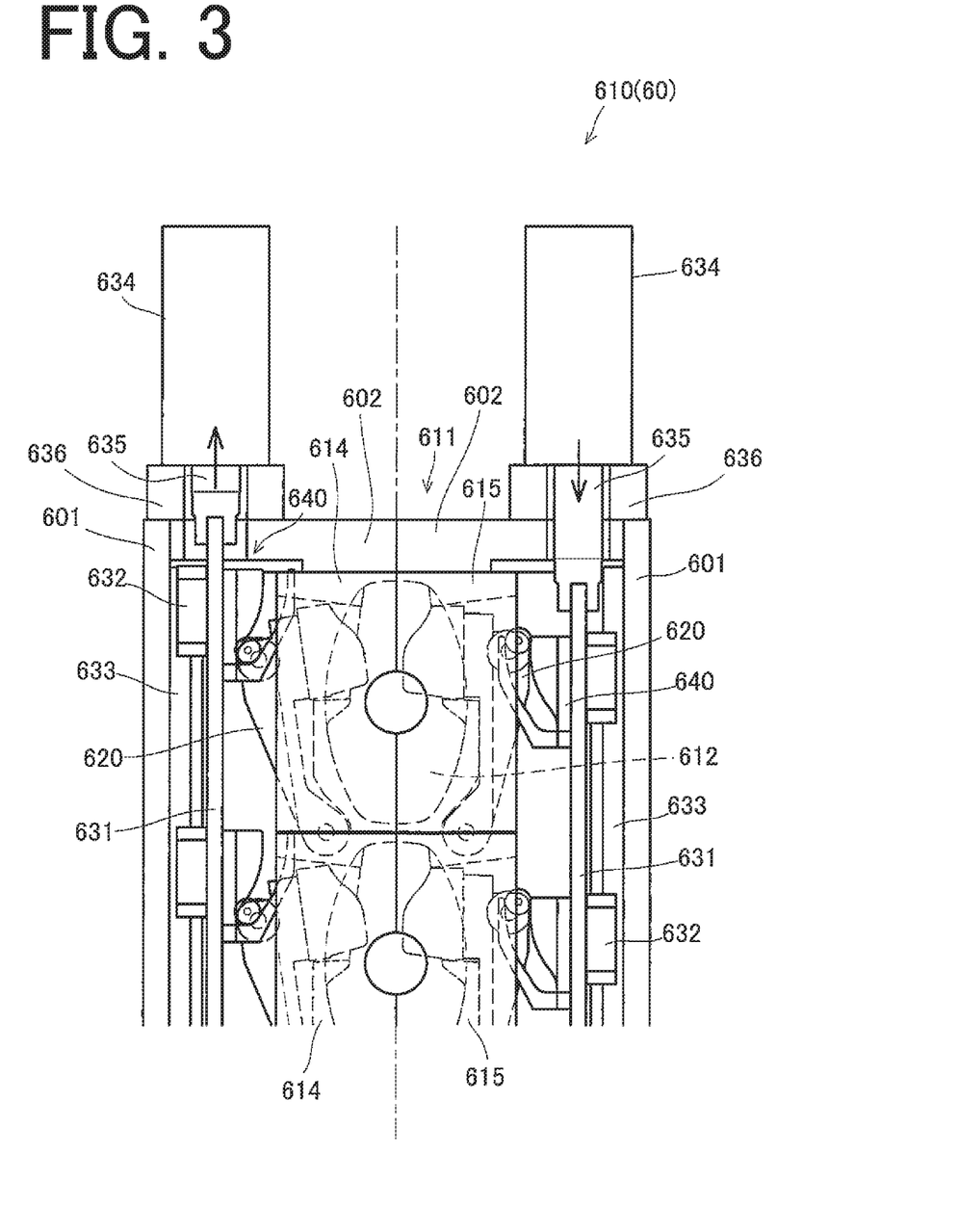
FIG. 3 is a top view showing a part of a blow mold according to the present invention.
Figure 4:
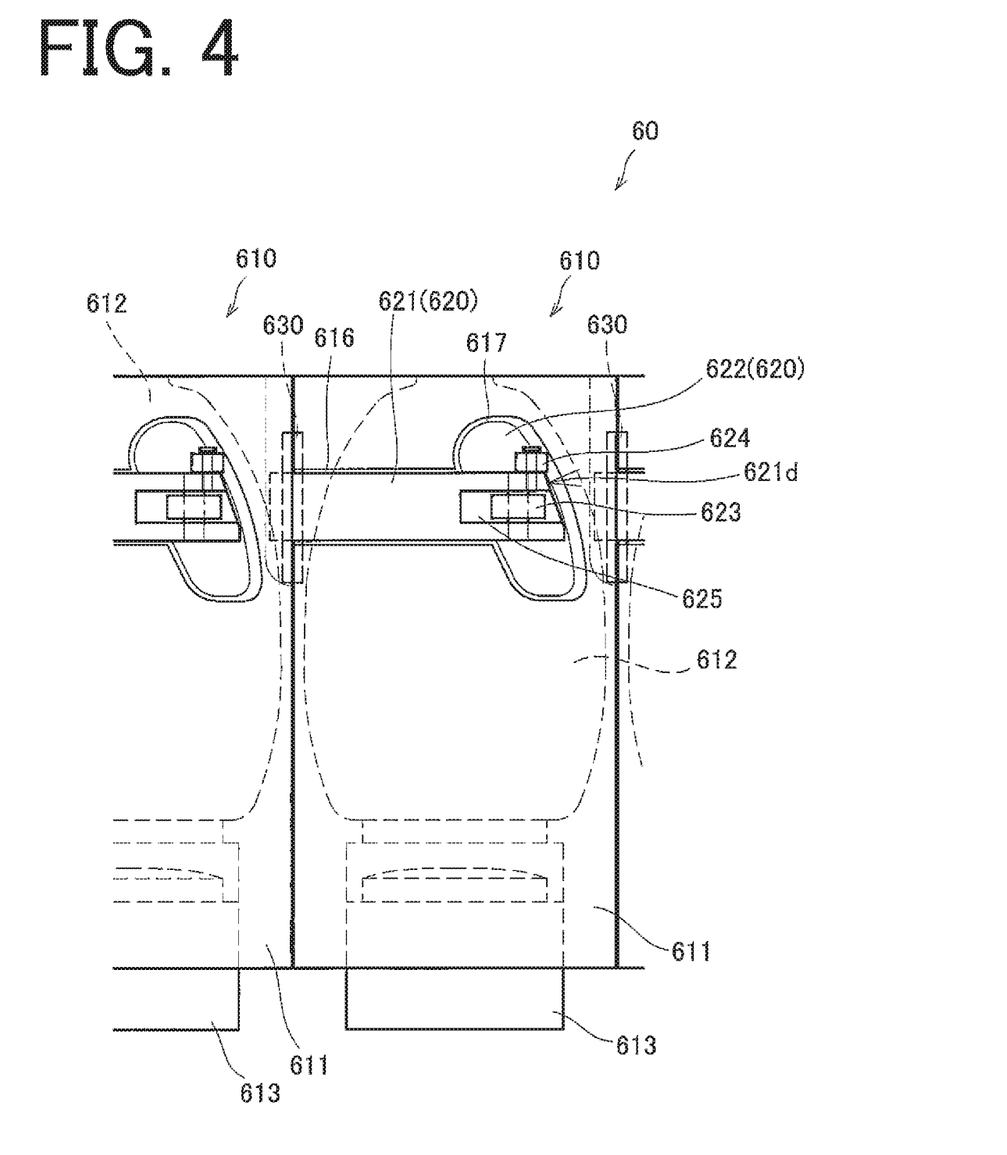
FIG. 4 is a front view showing a part of the blow mold according to the present invention.
Figure 5:
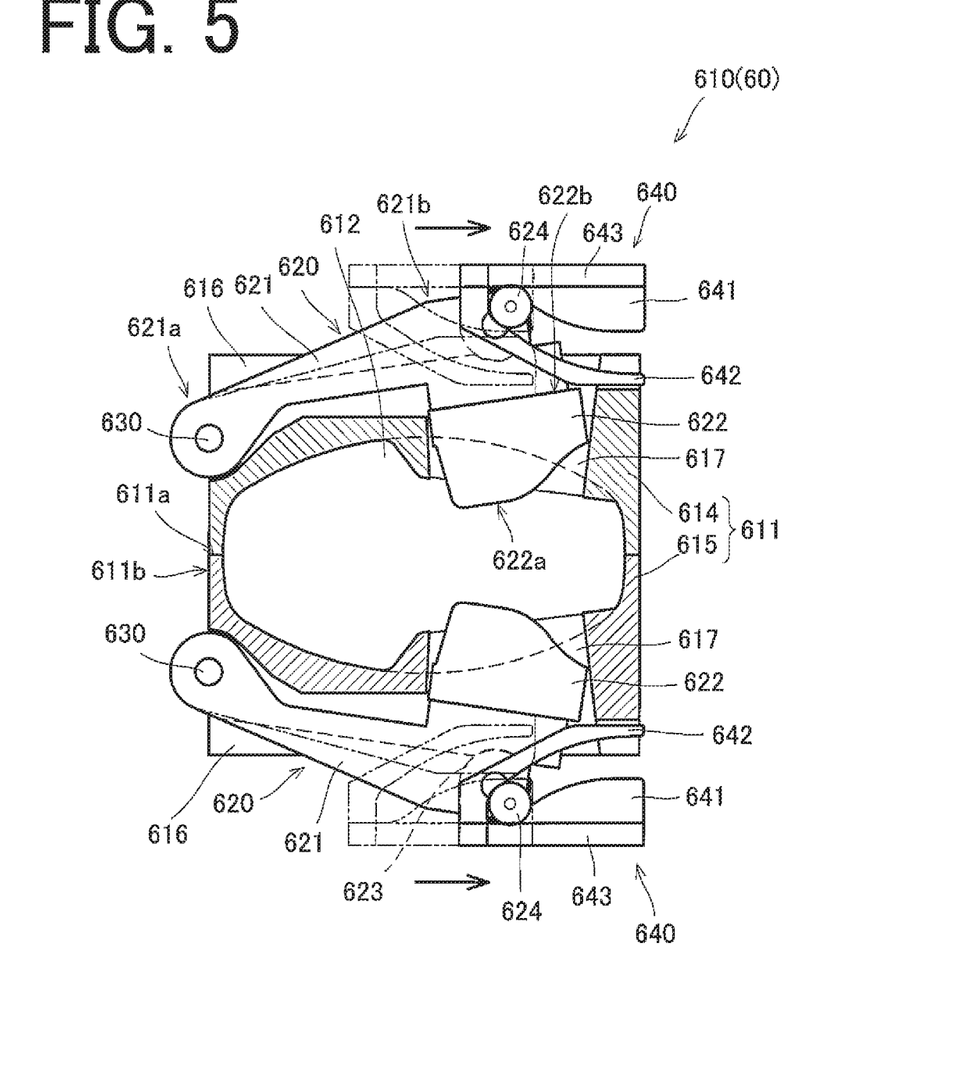
FIG. 5 is a sectional view showing the blow mold according to the present invention.
Figure 6:
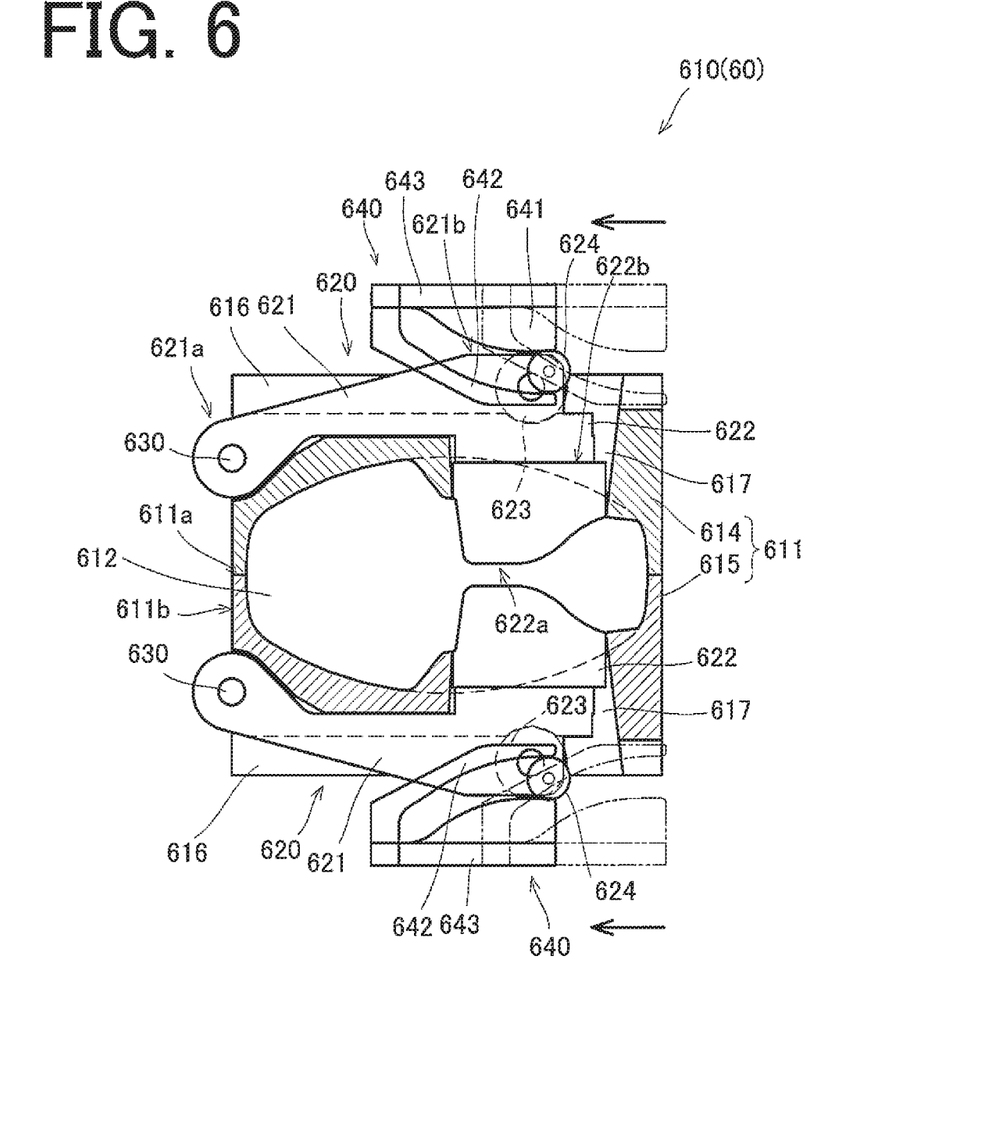
FIG. 6 is a sectional view showing the blow mold according to the present invention.
Figure 7:
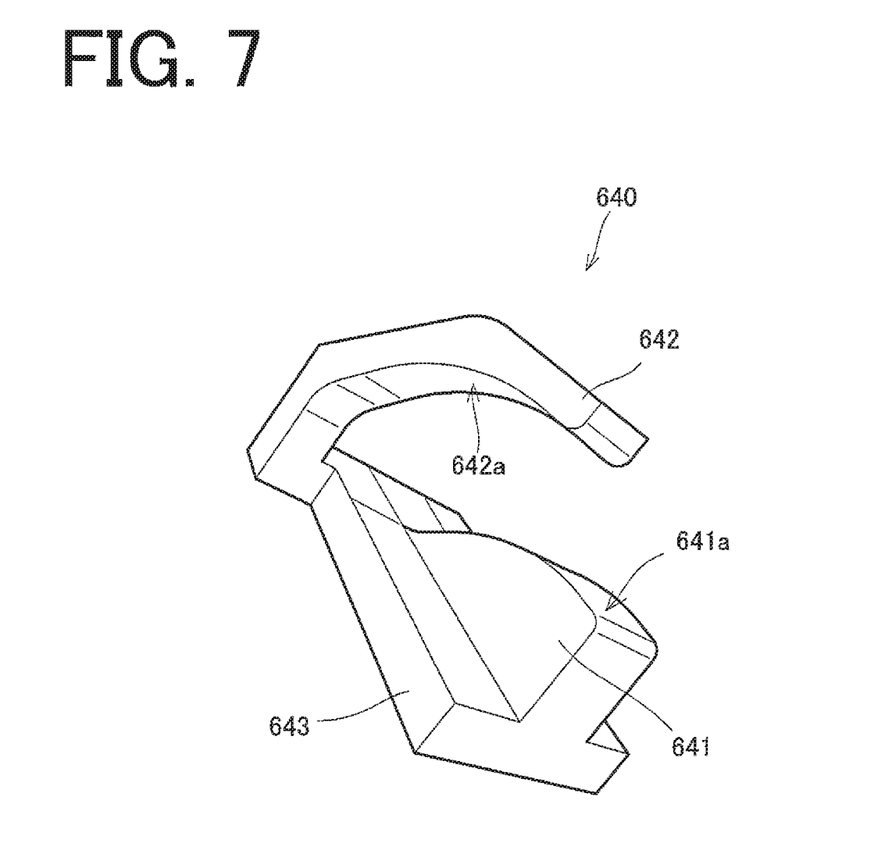
FIG. 7 is a perspective view of a cam member provided in the blow mold according to the present invention.
Figure 8:
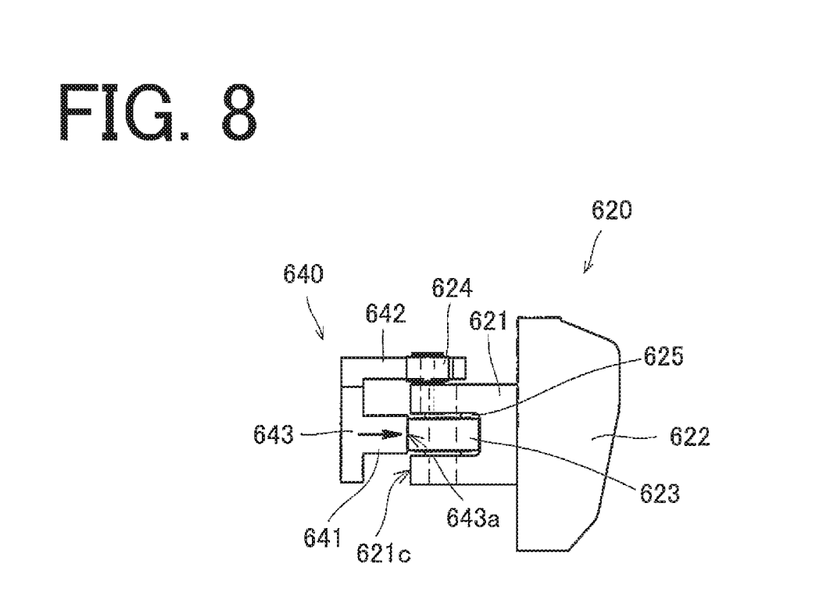
FIG. 8 is a view showing a state in which a link member is pressed by the cam member according to the present invention.
Figure 9:
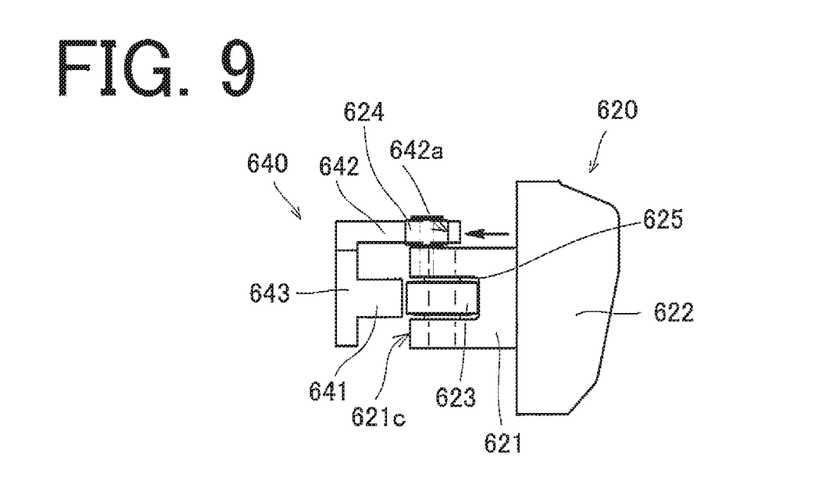
FIG. 9 is a view showing a state in which the link member is pressed by the cam member according to the present invention.

Hereinbelow, the blow mold according to the present invention will be described in detail. FIG. 3 is a top view showing a part of the blow mold, in which the left side shows a state where a link member is located at a standby position, while the right side shows a state where the link member is located at a molding position. FIG. 4 is a front view showing a part of the blow mold. FIGS. 5 and 6 are sectional views of the blow mold, FIG. 5 showing a state where the link member is located at the standby position, and FIG. 6 showing a state where the link member is located at the molding position. FIG. 7 is a perspective view of a cam member. FIG. 8 is a view showing a state in which the link member is pressed by the cam member when the link member is pivoted to the molding position. FIG. 9 is a view showing a state in which the link member is pressed by the cam member when the link member is pivoted to the standby position.

As shown in FIGS. 3 and 4, the blow molding section 60 is equipped with the blow mold 610 for blow-molding the preform transported from the heating section 50. In the present embodiment, the blow mold 610 includes a plurality of cavity molds 611 fixed to a base plate 601 and arranged adjacently in a row. The cavity mold 611 forms a cavity 612, a space where the preform is to be housed. In a lower part of the cavity mold 611, a bottom mold 613 for forming the bottom 15 of the resin container 10 is provided so as to be ascendable and descendable. Outside the respective cavity molds 611 arranged at both ends of the blow mold 610 (the cavity molds at both ends among those arranged in a row), pressure-receiving plates (pressure-receiving members) 602 are installed in a state fixed to the base plate 601. In upper parts of the cavity molds 611, blow core molds are provided so as to be ascendable and descendable, although they are not shown.

The cavity mold 611 is composed of a pair of split molds, i.e., a first split mold 614 and a second split mold 615, as shown in FIGS. 5 and 6. To the first split mold 614 and the second split mold 615, link members 620 for forming the grip portion 16 of the resin container 10 are attached by shaft members 630 so as to be pivotable. The blow mold 610 is also equipped with cam members 640 which are disposed lateral to each cavity mold 611 (lateral to the first split mold 614 and the second split mold 615) to press the link members 620, thereby pivoting them.

The link member 620 includes a lengthy link body 621 supported on one end side thereof by the shaft member 630 so as to be pivotable, and a recess insert die (convex insert die, convex movable mold) 622 fixed to the other end side of the link body 621 for forming the grip portion 16 of the resin container 10. In the present embodiment, the link body 621 has one end part (first end part) 621a supported pivotably by the shaft member 630 in the neighborhood of one end surface 611b in a direction orthogonal to a parting face 611a of the cavity mold 611. That is, the first end part 621a of the link body 621 is pivotably supported by the shaft member 630 disposed between the adjacent cavity molds 611 (see FIG. 4). The shaft member 630 may be fixed to the cavity mold 611, or may be fixed to other member provided outside the cavity mold 611.

The recess insert die 622 is a mold which presses the preform expanded during blow molding to form the grip portion 16 in the resin container 10. The recess insert die 622 is fixed to a second end part (an end part on a side opposite to the first end part 621a) of the link body 621 at a surface 622b thereof on a side opposite to a pressing surface 622a thereof so that the pressing surface 622a for pressing the preform faces toward the cavity 612.

The second end part 621b of the link body 621 is provided with a first cam follower 623 which contacts a first cam portion 641 provided in the cam member 640, and a second cam follower 624 which contacts a second cam portion 642 provided in the cam member 640. The first cam follower 623 and the second cam follower 624 are constituted by rollers (rotating members) rotatably supported by the link body 621. Thus, the first cam follower 623, when in contact with the first cam portion 641, rolls on the surface of the first cam portion 641. Similarly, the second cam follower 624, when in contact with the second cam portion 642, also rolls on the surface of the second cam portion 642.

The first cam follower 623 is provided, within a groove part 625 formed in nearly the middle in a thickness direction of the link body 621 (a direction orthogonal to a plane in which the link body 621 is pivoted), so as to protrude slightly outwardly of an end surface 621c of the link body 621 on a side opposite to the recess insert die 622 (see FIGS. 8, 9). The center in the thickness direction of the first cam follower 623 is located to be nearly flush with the center in the thickness direction of the recess insert die 622. Because of this feature, when the recess insert die 622 receives a blow pressure, the first cam portion 641 can appropriately take a load via the first cam follower 623.

For example, the load (blow pressure) that the first cam follower 623 receives becomes nearly uniform in the thickness direction of the first cam follower 623 and, accordingly, the load that the first cam portion 641 receives also becomes nearly uniform in the thickness direction of the first cam portion 641. That is, in the thickness direction of the first cam portion 641, variations in the load that the first cam portion 641 receives are kept down. Thus, the load on the cam member 640 having the first cam portion 641, and the loads on the respective members holding the cam member 640 can be reduced.

The second cam follower 624 is provided on the upper surface of the link body 621. As seen here, the second cam follower 624 is provided separately from the first cam follower 623, and the first cam follower 623 and the second cam follower 624 are arranged with spacing in the vertical direction.

The diameter of the second cam follower 624 is smaller than the diameter of the first cam follower 623, and the shaft center of the second cam follower 624 is disposed outwardly of the shaft center of the first cam follower 623 (on the side opposite to the cavity) (see FIGS. 8 and 9). Particularly, it is preferred that the shaft center of the second cam follower 624 be disposed outwardly of the shaft center of the first cam follower 623 and at a position close to the end surface 621c of the link body 621. In the present embodiment, moreover, the shaft center of the second cam follower 624 is provided at a position close to an end surface 621d of the link body 621 relative to the shaft center of the first cam follower 623 (see FIG. 4).

In a side surface 615a of each of the first split mold 614 and the second split mold 615 constituting the cavity mold 611 (i.e., a surface on the side opposite to the parting face 611a), an accommodation recess 616 is formed for accommodating the link member 620. At a position of the accommodation recess 616 corresponding to the recess insert die 622, a communication hole 617 communicating with the cavity 612 is formed. The recess insert die 622 protrudes through the communication hole 617 into the cavity 612 to form the grip portion 16 in the resin container 10.

On the other hand, the cam member 640 is provided, at a position corresponding to each link member 620 lateral to each cavity mold 611, so as to be linearly movable along the parting face 611a of the cavity mold 611. In the present embodiment, each cam member 640 is connected to and integrated with a flat plate- or rod-shaped coupling member 631. The coupling member 631 is provided continuously to span a plurality of the cavity molds 611 provided in parallel, and is mounted to a guide rail 633 via a slide member 632. That is, the coupling member 631 is configured to be linearly movable along the guide rail 633. In the present invention, the guide rail 633 is fixed to the base plate 601. To one end part in the longitudinal direction of the coupling member 631, a rod member 635 of an actuator device 634 is connected (see FIG. 3). The actuator device 634 is fixed to the pressure-receiving plate 602 and the base plate 601 via an actuator-fixing member 636.

In such a configuration, the actuator device 634 is operated to move the rod member 635 forward or backward, whereby the coupling member 631 having a plurality of the cam members 640 fixed thereto is linearly moved along the guide rail 633. In accordance with this linear movement, the plurality of cam member 640 are also linearly moved and, at this time, the cam members 640 press the link members 620 to pivot them. By this action, the link member 620 equipped with the recess insert die 622 can be pivoted, as appropriate, between the standby position and the molding position.

The cam member 640 includes a first cam portion 641 and a second cam portion 642 which contact the link member 620 to press the link member 620, as shown in FIG. 7. The first cam portion 641 is provided to protrude from the cam body 643 fixed to the coupling member 631 toward the link member 620. The first cam portion 641 is provided at a position (height) corresponding to the first cam follower 623 and, in accordance with the linear movement of the cam member 640, the first cam follower 623 contacts an end surface 641a of the first cam portion 641. The first cam portion 641 is formed to have an amount of protrusion gradually increasing from a site near the first end part 621a of the link member 620 toward the second end part 621b. That is, the amount of protrusion of the first cam portion 641 is gradually increased so that when the cam member 640 is linearly moved, the first cam follower 623 rolls on the end surface 641a of the first cam portion 641.

The second cam portion 642 is provided in a cantilever form, starting at an end part of the cam body 643 (first end part 621a of the link member 620), along the end surface 641a of the first cam portion 641 (end surface contacted by the first cam follower 623). That is, the second cam portion 642 has only one end side connected to the cam body 643, and has the other end side separated from the cam body 643. The second cam portion 642 is provided at a position (height) corresponding to the second cam follower 624. The second cam portion 642 is disposed on a side of the second cam follower 624 facing the cavity 612.

In the blow mold 610 configured as above, before molding of the preform, the link member 620 is located at the standby position where the recess insert die 622 is farthest from the cavity 612 (see FIG. 5). In the present embodiment, even when the link member 620 lies at the standby position, a part of the recess insert die 622 close to the pressing surface 622a protrudes into the cavity 612 without touching the preform. When the preform is blow-molded, the link member 620 pivots from the standby position to the molding position where the recess insert die 622 protrudes most into the cavity 612 (see FIG. 6). In other words, in accordance with the pivotal movement of the link member 620, the recess insert die 622 advances from the standby position to the molding position.

Concretely, the actuator device 634 is operated to advance the rod member 635 (see the right side in FIG. 3), thereby linearly moving each cam member 640 from beside the second end part 621b of the link member 620 toward the first end part 621a. On this occasion, as shown in FIG. 8, the first cam follower 623 contacts the end surface 641a of the first cam portion 641 and rolls on the end surface 641a of the first cam portion 641 and, in accordance with these motions, the link member 620 gradually pivots about the shaft member 630 toward the cavity 612. As a result, a part of the preform expanded by blow molding is pressed by the recess insert die 622, whereby the resin container 10 provided with the grip portion 16 is formed satisfactorily. At this time, the second cam follower 624 is in a state of non-contact with the second cam portion 642.

After the resin container 10 provided with the grip portion 16 is formed, the actuator device 634 is operated to retreat the rod member 635 (see the left side in FIG. 3), thereby linearly moving each cam member 640 from beside the first end part 621a of the link member 620 toward the second end part 621b. On this occasion, as shown in FIG. 9, the second cam follower 624 contacts an inner end surface 642a of the second cam portion 642 and rolls on the inner end surface 642a of the second cam portion 642. In accordance with these motions, the second end part 621b of the link member 620 pivots toward the outside of the cavity 612. That is, the link member 620 gradually pivots from the molding position toward the standby position. Consequently, the link member 620 can be pivoted satisfactorily from the molding position to the standby position. In other words, the recess insert die 622 can be retreated satisfactorily from the molding position to the standby position. At this time, the first cam follower 623 is in a state of non-contact with the first cam portion 641.

In the blow mold 610 according to the present embodiment, as described above, the cam member 640 provided in correspondence with each cavity mold 611 is linearly moved, whereby the link member 620 equipped with the recess insert die 622 is pivoted. Thus, the structure of the blow mold 610 can be rendered relatively simple to downsize the blow mold 610. Since the blow mold 610 is downsized, the blow molding apparatus 20 can be downsized, and the cost can be cut down.

In the present embodiment, moreover, the first cam portion 641 and the second cam portion 642 provided in the cam member 640 are provided at a distance in the height direction of the cavity mold 611, so that the cam member 640 can be incorporated into the blow mold 610 relatively easily.

That is, the second cam portion 642 can be incorporated inside the second cam follower 624 (beside the cavity 612) relatively easily.

Furthermore, in the present embodiment, the second cam portion 642 is provided in a cantilever form, starting at the cam body 643, along the end surface of the first cam portion 641. That is, the second cam portion 642 is formed, with its one end being open. Thus, the second cam portion 642 can be incorporated inside the second cam follower 624 more easily.

As stated above, the diameter of the second cam follower 624 is smaller than the diameter of the first cam follower 623. Besides, the shaft center of the second cam follower 624 is disposed outwardly of the cavity 612 relative to the shaft center of the first cam follower 623. Because of this disposition, the moving distance of the cam body 643 necessary for returning the link member 620 from the molding position to the standby position can be shortened, thus making it possible to downsize the cam body 643. Hence, the blow mold 610 can be further downsized. In particular, the width of the blow mold 610 in the direction orthogonal to the parting face can be made even smaller.

If the shape of the cam member or the like is changed, the link member can be returned from the molding position to the standby position, for example, by utilizing the first cam follower alone. However, the moving distance of the cam member will become relatively long, and the blow mold will also be upsized.

In order to return the link member from the molding position to the standby position by utilizing only the first cam follower, it is required, for example, that the first cam portion and the second cam portion of the cam member be placed on the same horizontal surface. Moreover, the space (groove) between the first cam portion and the second cam portion is required to be of a size equal to or larger than the diameter of the first cam follower which is larger than the second cam follower. Thus, the cam member is upsized. In addition, the groove part of the link body must also be made large so that the second cam portion can enter there. As a result, the width of the blow mold in the direction orthogonal to the parting face becomes large, and the blow mold is upsized.

The second cam follower 624 is not subject to a blow air pressure. Although its diameter is smaller than the diameter of the first cam follower 623, therefore, the link member 620 can be appropriately pivoted from the molding position to the standby position.

In the present embodiment, moreover, the link member 620 is pivoted using the two different cam mechanisms. In other words, the loci of the first cam follower 623 and the second cam follower 624 when pivoting the link member 620 are different from each other. Consequently, the recess insert die 622 can be advanced to and retreated from the cavity 621 at appropriate different speeds. Concretely, the recess insert die 622 can be advanced more quickly than when retreated. Thus, the shapability during blow molding can also be improved. By retreating the recess insert die 622 more slowly than when advancing it, moreover, deformation or rubbing of the grip portion 16 of the resin container 10 can be suppressed.

In the blow mold 610 according to the present embodiment, additionally, the plurality of cam members 640 are integrated by the coupling member 631, and can be operated using the single actuator device 634. Hence, the present invention is particularly effective when applied to the blow mold 610 having a plurality of the cavity molds 611.

The one embodiment of the present invention has been described above, but it is to be understood that the invention is in no way limited to this embodiment. The present invention can be changed or modified, as appropriate, without departing from its spirit.

In the above embodiment, for example, the configuration in which the blow mold has the plurality of cavity molds is illustrated. Needless to say, however, the blow mold may be equipped with a single cavity mold.

In the above embodiment, the configuration in which the link member has the first cam follower and the second cam follower is illustrated. However, it suffices that the link member can be pressed by the cam member, and the link member need not necessarily be provided with the first cam follower and the second cam follower.

The above embodiment also illustrates the configuration in which the diameter of the second cam follower is rendered smaller than the diameter of the first cam follower, and the shaft center of the second cam follower is disposed outwardly of the cavity relative to the shaft center of the first cam follower. It goes without saying, however, that no limitations are imposed on the diameter and the shaft center of the second cam follower.

In the above embodiment, moreover, the cam member is provided with the first cam portion and the second cam portion, and the second cam portion presses the link member to pivot it from the molding position to the standby position. However, the second cam portion need not necessarily be provided. For example, there may be a configuration in which the link member is urged toward the outside of the cavity by an elastic member such as a coil spring and, when the pressing of the link member by the first cam portion is released, the link member is pivoted toward the standby position under the elastic force of the elastic member.

The above embodiment also illustrates the blow molding apparatus equipped with the transport section of the type which continuously transports the preform. However, the configuration of the transport section is not particularly limited, and need not necessarily be one for continuously transporting the preform.

EXPLANATIONS OF LETTERS OR NUMERALS

10 Resin container
11 Mouth
12 Neck
13 Barrel
14 Shoulder
15 Bottom
16 Grip portion
20 Blow molding apparatus
30 Injection molding section
40 Cooling section
50 Heating section
60 Blow molding section
70 Continuous transport section
80 Intermittent transport section
200 Preform
601 Base plate
602 Pressure-receiving plate (pressure-receiving member)
610 Blow mold
611 Cavity mold
611a Parting face
611b End surface
612 Cavity
613 Bottom mold
614 First split mold
615 Second split mold
616 Accommodation recess
617 Communication hole
620 Link member
621 Link body
621a First end part
621b Second end part
622 Recess insert die (convex insert die, convex movable mold)
622a Pressing surface
623 First cam follower
624 Second cam follower
625 Groove part
630 Shaft member
631 Coupling member
632 Slide member
633 Guide rail
634 Actuator device
635 Rod member
636 Actuator-fixing member
640 Cam member
641 First cam portion
642 Second cam portion
642a Inner end surface
643 Cam body

The invention claimed is:

1. A blow mold for blow-molding a resin container equipped with a grip portion, comprising:
a cavity mold composed of a pair of split molds for forming a cavity in which a bottomed cylindrical preform is to be housed;
a link member having one end side pivotably supported by a shaft member, and having on another end side a recess insert die which presses the preform during blow molding to form the grip portion; and
a cam member which is provided lateral to the cavity mold so as to be linearly movable, and which presses the link member in accordance with a linear movement thereof to pivot the link member, wherein
the cam member has a first cam portion for pressing the link member toward the cavity in accordance with the linear movement to pivot the link member, and
the cam member has a second cam portion for pressing the link member toward an outside of the cavity to pivot the link member.

2. The blow mold according to claim 1, wherein
the first cam portion and the second cam portion are provided at a distance in a height direction of the cavity mold.

3. The blow mold according to claim 2, wherein
the first cam portion is provided to protrude from a body part of the cam member toward the cavity mold, and
the second cam portion is provided to extend in a cantilever form from the body part along an end surface of the first cam portion.

4. The blow mold according to claim 2, wherein
the link member has a first cam follower which the first cam portion contacts and which rolls on a surface of the first cam portion; and has, separately from the first cam follower, a second cam follower which the second cam portion contacts and which rolls on a surface of the second cam portion.

5. The blow mold according to claim 4, wherein
a diameter of the second cam follower is smaller than a diameter of the first cam follower.

6. The blow mold according to claim 5, wherein
a shaft center of the second cam follower is disposed outwardly of the cavity with respect to a shaft center of the first cam follower.

7. A blow mold for blow-molding a resin container equipped with a grip portion, comprising:
a cavity mold composed of a pair of split molds for forming a cavity in which a bottomed cylindrical preform is to be housed;
a link member having one end side pivotably supported by a shaft member, and having on another end side a recess insert die which presses the preform during blow molding to form the grip portion; and
a cam member which is provided lateral to the cavity mold so as to be linearly movable, and which presses the link member in accordance with a linear movement thereof to pivot the link member,
the blow mold being equipped with a plurality of cavity molds arranged adjacently, wherein
a plurality of cam members provided in correspondence with the cavity molds are fixed to a coupling member and integrated therewith, and
an actuator device for linearly reciprocating the coupling member is connected to one end side of the coupling member to which the plurality of cam members are fixed.

8. The blow mold according to claim 7, wherein
the cam member has a first cam portion for pressing the link member toward the cavity in accordance with the linear movement to pivot the link member.

9. The blow mold according to claim 8, wherein
the cam member has a second cam portion for pressing the link member toward an outside of the cavity to pivot the link member.

10. The blow mold according to claim 9, wherein
the first cam portion and the second cam portion are provided at a distance in a height direction of the cavity mold.

11. The blow mold according to claim 10, wherein
the first cam portion is provided to protrude from a body part of the cam member toward the cavity mold, and
the second cam portion is provided to extend in a cantilever form from the body part along an end surface of the first cam portion.

12. The blow mold according to claim 10, wherein
the link member has a first cam follower which the first cam portion contacts and which rolls on a surface of the first cam portion; and has, separately from the first cam follower, a second cam follower which the second cam portion contacts and which rolls on a surface of the second cam portion.

13. The blow mold according to claim 12, wherein
a diameter of the second cam follower is smaller than a diameter of the first cam follower.

14. The blow mold according to claim 13, wherein
a shaft center of the second cam follower is disposed outwardly of the cavity with respect to a shaft center of the first cam follower.

* * * * *